2,458,461
Patented July 29, 1969

3,458,461
HALOGEN-CONTAINING ELASTOMERS VULCANIZED WITH SULFUR AND A SALT OF A CARBOXYLIC ACID
Frederick France Mihal, Dunellen, N.J., assignor to American Cyanamid Company, Stamford, Conn., a corporation of Maine
No Drawing. Continuation-in-part of application Ser. No. 484,437, Sept. 1, 1965. This application July 28, 1966, Ser. No. 568,374
Int. Cl. C08f 27/00, 45/72
U.S. Cl. 260—23                              17 Claims

ABSTRACT OF THE DISCLOSURE

The properties of active halogen-containing elastomers, such as copolymers and terpolymers containing vinyl chloroacetate, are improved by incorporating into the elastomer before vulcanization from about 0.05 to 2.5 parts of sulfur and from about 0.5 to 7 parts of at least one alkali metal salt of an organic carboxylic acid per 100 parts of elastomer. Sodium stearate is a preferred alkali metal salt.

---

This application is a continuation-in-part of copending application Ser. No. 484,437, filed Sept. 1, 1965, now abandoned.

This invention relates to a process for vulcanizing active halogen-containing elastomers with sulfur and alkali metal salts of organic acids.

By the term "halogen-containing elastomers" is meant those polymers and copolymers which contain a halogen atom as a substituent on a recurring unit in the polymer structure through which vulcanization can be achieved at least in part. Among the elastomers containing active halogens that are commercially available or known are included the following: butyl (isobutylene-isoprene copolymers) containing at least one halogen selected from the group consisting of chlorine, bromine and iodine such as described in U.S. Patents Nos. 2,631,984, 2,681,899, 2,698,041, 2,700,997, 2,720,479, and 2,732,354 as well as those described in Rubber World, 138, 725 (1955) and Ind. Eng. Chem., 47, 1562 (1955), including neoprene or other polymers and copolymers based on chloroprene; acrylates, such as copolymers of an acrylate as represented by ethyl acrylate and vinyl chloroethyl ether, 2-chloroethyl acrylate, vinyl $\alpha$-haloacylates typified by vinyl $\alpha$-chloroacetate, vinyl $\alpha$-chloropropionate, vinyl $\alpha$-chlorobutyrate, and the like, wherein the halogens are as previously indicated and at least one is present on the alpha-carbon of the acid involved and where additional comonomers may be employed along with the acrylate and the halogen-containing comonomer as described in U.S. Patent No. 3,201,373; polyesters wherein halogens are present in the polymers through condensation of suitable amounts of the appropriately substituted acids or glycols; halogenated polyethylene wherein about one atom of halogen is present per 6–7 atoms of carbon in the chain and some of the halogens are present in the form of —SO$_2$X where X represents a halogen as previously defined; copolymers of vinylidene chloride; and the like.

Various agents have been used or suggested for the curing of halogen-containing elastomers. Among the curing agents which have been suggested are ammonia and various primary and secondary amines. Unfortunately, for most purposes, ammonia and amines are too fast reacting as curing agents in many uses. Particularly, is this true of elastomers based on acrylates and vinyl $\alpha$-haloacylates.

Improved curing systems for halogen-containing elastomers are known and relate to the use of ammonium salts, ammonium salts plus alkyl halides, ammonium salt plus alkaline earth metal oxides, respectively, as curing agents. These curing systems offer several advantages over former systems. There exists, however, a continuing need for improved curing systems which are effective with a variety of halogen-containing elastomers, are capable of variation to control curing rates, improve certain properties of the cured elastomers, provide economic advantages, and otherwise overcome deficiencies of the known systems.

It is an object of this invention to improve upon known systems for curing reactive halogen-containing elastomers. It is a further object to provide a curing system which is economical and effective from the standpoint of improved mold release properties and possible elimination of post-curing operations. Other objects will become apparent from a reading of the following specification.

It has now been discovered that a curing system comprising sulfur and alkali metal salts of organic (carboxylic) acids offers advantages over previously known curing systems. These advantages include better mold release of the cured elastomer, better economy and elimination of post-curing in certain instances. This result is surprising in view of the fact that neither sulfur nor alkali metal salts of organic acids, when used alone, give satisfactory vulcanizates.

Uses of halogen-containing elastomers vary widely and are influenced to some extent by the chemical nature of the elastomer, with the preferred use for a particular elastomer being one wherein maximum advantage is taken of the special chemical properties of said elastomer. For example, copolymers of an acrylate, acrylonitrile and a vinyl $\alpha$-haloacylate form oil-resistant molded products and advantage is taken of this property in making O rings, oil seals, gaskets, and the like, of this elastomer type. In any case it is important that the cured products be easily and rapidly released by the mold.

Sulfur and many alkali metal salts of organic acids are cheaper than most of the previously used curing agents, such as amines. Hence this invention provides an economical curing system.

With many of the previously used curing agents it is necessary to post-cure the vulcanized article for an extended period of time at a temperature of about 150° C. in order to develop fully the physical properties desired in the vulcanizate. While in certain cases the present invention eliminates the need for post-curing, it also allows such post-curing to be employed where desirable by virtue of the flexibility of the cure than can be obtained by suitable alteration of the ingredients making up the curing system.

Although the curing process of this invention is usable with any of the halogen-containing elastomers previously named, it is particularly valuable for curing those elastomers containing $\alpha$-haloacylate groups.

The process comprises mixing the unvulcanized elastomer with sulfur, an alkali metal salt of an organic acid and other additives. The compounding can be done on a rubber mill by standard procedures. The compounded rubber is then cured at an elevated temperature, as in a heated mold.

The amount of sulfur used should be between 0.05% and 2.5% preferably between 0.2% and 1.0%, based on the weight of the elastomer.

The alkali metal salts which may be used include the sodium, potassium and lithium salts of mono- and polybasic organic acids, such as acetic acid, caproic acid, caprylic acid, lauric acid, stearic acid, tartaric acid, pimelic acid, adipic acid, sebacic acid, succinic acid, terephthalic acid, benzoic acid, salicylic acid, and the like. Representative salts include sodium stearate, potassium stearate, sodium acetate, potassium sodium tartate. Combinations of salts can be used. The stearate salts are the preferred class of salts.

The amount of alkali metal salt used should be between 0.5% and 7.0%, preferably between 2.0% and 5.0%, based on the weight of the elastomer.

The potassium salts produce a faster cure than the corresponding sodium salts. Therefore, the curing rate can be controlled to a considerable degree by proper selection of the salt. Further control can be secured by using combinations of sodium and potassium salts, such as by mixing sodium and potassium stearates.

Acids retard the cure system. Therefore, still further control is possible by using an acid such as stearic acid to retard the curing rate.

Additives normally used in compounding elastomers may be added at the time of compounding the elastomer. These additives include carbon black and other fillers and pigments, antioxidants, stabilizers, and the like.

The compounded elastomers are vulcanized by standard procedures. Curing temperatures above 150° C. are recommended.

The invention is more fully illustrated by the examples which follow.

Example 1

Five batches of a 97.5/2.5 ethyl acrylate/vinyl chloroacetate elastomer are compounded by the formulations shown in Table I.

The Mooney scorch rates are shown as $t_5$ which represents the time in minutes for a 5-point increase in the Mooney viscosity from the minimum viscosity at the temperature of measurement.

TABLE I

| | Parts | | | | |
|---|---|---|---|---|---|
| | A | B | C | D | E |
| Elastomer | 100 | 100 | 100 | 100 | 100 |
| Sodium stearate | 2 | 5 | 2 | 5 | 3.5 |
| Carbon black [1] | 50 | 50 | 50 | 50 | 50 |
| Sulfur | 0.25 | 0.25 | 1.25 | 1.25 | 0.75 |
| Phenyl-beta-naphthylamine | 2 | 2 | 2 | 2 | 2 |
| Mooney scorch rate, minutes | | | | | |
| $t_5$ at 250° F | 13 | 10 | 10.5 | 7.5 | 9.5 |
| $t_5$ at 329° F | 2.1 | 1.9 | 1.6 | 1.3 | 1.5 |

[1] Fast extruding furnace carbon black.

Samples of the compounded elastomers are then vulcanized by heating at 165° C. for the length of time shown in Table II. The physical properties of the vulcanized elastomers are shown in Table II.

TABLE II

| | A | B | C | D | E |
|---|---|---|---|---|---|
| Vulcanization time (min.) | 20 | 20 | 15 | 15 | 15 |
| Tensile strength (p.s.i.) | 1,490 | 1,797 | 1,673 | 1,880 | 1,830 |
| Elongation (percent) | 458 | 247 | 393 | 160 | 253 |
| Modulus, 100% (p.s.i.) | 303 | 787 | 420 | 1,350 | 813 |
| Modulus, 200% (p.s.i.) | 760 | 1,613 | 1,053 | | 1,630 |
| Hardness, Shore A | 57 | 62 | 59 | 67 | 63 |

Example 2

A 95/5 ethyl acrylate/vinyl chloroethyl ether elastomer is compounded by the formulation shown in Table III.

TABLE III

| | Parts |
|---|---|
| Elastomer | 100 |
| Stearic acid | 1.5 |
| Carbon black [1] | 50 |
| Potassium stearate | 3 |
| Sulfur | 1 |

[1] Fast extruding furnace black.

The compounded elastomer is cured at 165° C. for 15 minutes. A portion of the vulcanizate is then post-cured at 150° C. for 24 hours. The physical properties of the vulcanized elastomer are shown in Table IV.

TABLE IV

| | Parts |
|---|---|
| Tensile strength (p.s.i.) | 1570 |
| Elongation (percent) | 427 |
| Modulus, 100% (p.s.i.) | 420 |
| Shore Hardness A | 65 |

Example 3

The procedure of Example 1 is followed substituting an equivalent amount of sodium acetate in place of the sodium stearate. The physical properties of the vulcanizates are similar to those shown in Table II of Example 1.

Example 4

The procedure of Example 1 is followed substituting an equivalent amount of sodium benzoate in place of the sodium stearate. The physical properties of the vulcanizates are similar to those shown in Table II of Example 1.

Example 5

The procedure of Example 1 is followed substituting an equivalent amount of disodium terephthalate in place of the sodium stearate. The physical properties of the vulcanizates are similar to those shown in Table II of Example 1.

Example 6

The procedure of Example 1 is followed substituting an equivalent amount of potassium sodium tartrate in place of the sodium stearate. The physical properties of the vulcanizates are similar to those shown in Table II of Example 1.

Example 7

The procedure of Example 1 is followed substituting an equivalent amount of disodium adipate in place of the sodium stearate. The physical properties of the vulcanizates are similar to those shown in Table II of Example 1.

Example 8

A 95/5 (monomer ratio) ethyl acrylate/vinyl chloroacetate elastomer containing about 1% chlorine is compounded by the formulation shown in Table V.

TABLE V

| | Parts |
|---|---|
| Elastomer | 100 |
| Stearic acid | 2 |
| Carbon black [1] | 60 |
| Sodium stearate | 3 |
| Sulfur | 1 |

[1] Fast extruding furnace black.

The compounded elastomer is cured at 165° C. for 13 minutes. The physical properties of the vulcanized elastomer are shown in Table VI.

TABLE VI

| | |
|---|---|
| Tensile strength (p.s.i.) | 1645 |
| Elongation (percent) | 320 |
| Modulus, 100% (p.s.i.) | 593 |
| Shore Hardness A | 67 |

Example 9

A 95/5 (monomer ratio) ethyl acrylate/vinyl chloroacetate elastomer containing about 1% chlorine is compounded by the formulation shown in Table VII.

TABLE VII

| | Parts |
|---|---|
| Elastomer | 100 |
| Stearic acid | 2 |
| Carbon black [1] | 60 |
| Potassium stearate | 3 |
| Sulfur | 1 |

[1] Fast extruding furnace black.

The compounded elastomer is cured at 160° C. for two minutes. The physical properties of the vulcanized elastomer are shown in Table VIII.

TABLE VIII

| | Parts |
|---|---|
| Tensile strength (p.s.i.) | 1850 |
| Elongation (percent) | 237 |
| Modulus, 100% (p.s.i.) | 931 |
| Shore Hardness A | 68 |

Example 10

A 95/5 (monomer ratio) ethyl acrylate/vinyl chloroacetate elastomer containing about 1% chlorine is compounded by the formulation shown in Table IX.

TABLE IX

| | Parts |
|---|---|
| Elastomer | 100 |
| Stearic acid | 0.5 |
| Carbon black [1] | 60 |
| Soap [2] | 3 |
| Sulfur | 0.5 |

[1] Fast extruding furnace black.
[2] Sodium salts of saponified coconut oil and tallow.

| Mooney scorch rate | Minutes |
|---|---|
| $t_5$ at 250° F. | 9.8 |

Samples of the compounded elastomers are then vulcanized by heating at 165° C. for 9 minutes. The physical properties of the vulcanized elastomer are shown in Table X.

TABLE X

| | Parts |
|---|---|
| Tensile strength (p.s.i.) | 1720 |
| Elongation (percent) | 270 |
| Modulus, 100% (p.s.i.) | 810 |
| Shore Hardness A | 70 |

Example 11

An 83/12/5 (monomer ratio) butyl acrylate/cyanoethyl acrylate/vinyl chloroacetate elastomer containing about 1% chlorine is compounded by the formulation shown in Table XI.

TABLE XI

| | Parts |
|---|---|
| Elastomer | 100 |
| Stearic acid | 2 |
| Phenyl-beta-naphthylamine | 2 |
| Carbon black [1] | 60 |
| Soap [2] | 3 |
| Potassium stearate | 0.5 |
| Sulfur | 0.3 |

[1] Fast extruding furnace black.
[2] Sodium salts of saponified coconut oil and tallow.

The compounded elastomer is cured at 165° C. for 12 minutes and post-cured at 150° C. for 16 hours. The physical properties of the vulcanized elastomer are shown in Table XII.

TABLE XII

| | Parts |
|---|---|
| Tensile strength (p.s.i.) | 1385 |
| Elongation (percent) | 125 |
| Modulus, 100% (p.s.i.) | 1200 |
| Shore hardness A | 69 |

Example 12

Using the technique of Example 1 the curability of several additional elastomers was studied employing the Mooney values as indications of cure rates and rheometer values as indications of the state of cure. The following table characterizes the curability of the various elastomers.

| Elastomer: | Curability |
|---|---|
| Neoprene | Fast |
| Hypalon | Fast |
| Chlorobutyl | Slow |

This example shows that other halogen-containing elastomers may be effectively cured with sulfur and alkali metal salts of organic acids. Although chlorobutyl cures slowly with the curatives of the present invention, an effective cure is obtained if the time of curing is sufficient.

I claim:

1. A vulcanizable composition comprising an active halogen-containing elastomer with between 0.05 and 2.5 parts of sulfur and 0.5 and 7 parts of at least one alkali metal salt of an organic carboxylic acid per 100 parts of elastomer.

2. The composition of claim 1 wherein the elastomer is a copolymer of an alkyl acrylate and vinyl chloroacetate.

3. The composition of claim 1 wherein the elastomer is a copolymer of ethyl acrylate and vinyl chloroacetate.

4. The composition of claim 1 wherein the elastomer is a terpolymer of a lower alkyl acrylate, cyanoethyl acrylate and vinyl chloroacetate.

5. The composition of claim 4 wherein the lower alkyl acrylate is ethyl acrylate.

6. The composition of claim 1 wherein the alkali metal salt is sodium stearate.

7. The composition of claim 1 wherein the alkali metal salt is potassium stearate.

8. The process of vulcanizing a vulcanizable active halogen-containing acrylic elastomer, which comprises compounding said elastomer with between 0.05 and 2.5 parts of sulfur and between 0.5 and 7 parts of at least one alkali metal salt of an organic carboxylic acid per 100 parts of elastomer; and heating said compounding mixture until vulcanization is completed.

9. The process of claim 8 wherein the elastomer is a copolymer of ethyl acrylate and vinyl chloroacetate.

10. The process of claim 9 wherein the alkali metal salt is sodium stearate.

11. The process of claim 8 wherein the vulcanizable elastomer is the elastomer of claim 4.

12. The process of claim 8 wherein the vulcanizable elastomer is the elastomer of claim 5.

13. The vulcanizate obtained by the process of claim 8.

14. The vulcanizate obtained by the process of claim 9.

15. The vulcanizate obtained by the process of claim 10.

16. The vulcanizate obtained by the process of claim 11.

17. The vulcanizate obtained by the process of claim 12.

References Cited

UNITED STATES PATENTS

| 3,113,122 | 12/1963 | La Combe et al. | 260—85.5 |
| 3,201,373 | 8/1965 | Kaizerman | 260—79.5 |
| 3,244,774 | 4/1966 | Kaupp et al. | 260—897 |
| 3,324,088 | 6/1967 | Waldron | 260—79.3 |
| 3,337,492 | 8/1967 | Waldron et al. | 260—45.7 |

DONALD E. CZAJA, Primary Examiner

R. A. WHITE, Assistant Examiner

U.S. Cl. X.R.

260—23.7, 41, 41.5, 45.9, 79.5